Feb. 28, 1928.

C. O. SWENSON

LOCK WASHER

Filed July 30, 1926

Inventor:
Carl O. Swenson

Patented Feb. 28, 1928.

1,660,772

UNITED STATES PATENT OFFICE.

CARL O. SWENSON, OF CHICAGO, ILLINOIS, ASSIGNOR TO JENS P. NIELSEN, OF CHICAGO, ILLINOIS.

LOCK WASHER.

Application filed July 30, 1926. Serial No. 125,837.

The invention relates to a lock washer of the type comprising an unbroken annulus formed with radially disposed locking teeth. Customarily the teeth are made relatively narrow and are bent or twisted with respect to the plane of the annulus so that their side edges are offset in opposite directions, thereby producing cutting edges to engage with the nut or other part to be held.

Difficulty has been experienced with such washers because of the inability of the teeth to withstand the pressure of the opposing surfaces, with the result that the teeth are forced back into the plane of the annulus and their locking function destroyed or at least substantially lessened. The tendency of the teeth to become flattened under pressure appears to be due to the fact that it is impractical in the manufacture of such lock washers to impart a sufficient twist to the tooth.

The primary object of my invention is to provide an improved construction for the locking teeth of a lock washer of the general character indicated, by making the teeth generally T-shaped in form with the tip portion relatively wider than the shank portion. Thus the tip of the tooth is made of substantial width so that its ends may be readily bent in opposite directions to produce claw-like projections adapted to engage the opposed surfaces at a relatively sharp angle and thus effectually lock the parts against relative rotation in one direction.

Another object is to provide an improved lock washer of rugged construction which is efficient in operation and is capable of being manufactured at a low cost.

Further objects and advantages will become apparent as the description proceeds.

Figure 1:
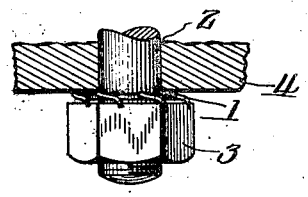
Figure 1 is a view partly in section illustrating a preferred form of the invention positioned on a bolt between a nut and an object through which the bolt is inserted.

For purposes of disclosure, I have illustrated in the drawings and will hereinafter describe in detail two embodiments of the invention, with the understanding that I do not intend to limit my invention to the particular construction and arrangement shown, it being contemplated that various changes may be made by those skilled in the art without departing from the spirit and scope of the appended claims.

The invention contemplates generally an annulus, unbroken peripherally, and having a plurality of tooth-like projections extending therefrom in circumferentially spaced relation. As illustrated in Fig. 1, such a device 1 is adapted to be placed upon a bolt 2 between the nut 3 and an object 4 against which it is desired to tighten the nut, the washer serving, when once clamped in place, to resist any tendency of the nut to loosen.

In its preferred form, as illustrated in Figs. 2, 4, 5 and 6, my improved washer is punched from a sheet of suitable metal such as steel, and is then hardened and drawn to a spring temper. The washer comprises an annulus 5 having a bolt receiving aperture 6 therein. A plurality of teeth 7 are cut in one peripheral edge of the annulus so as to be integral therewith and extend outwardly therefrom in circumferentially spaced relation. As illustrated most clearly in Figs. 5 and 6, each tooth has a shank portion 8 which is widest at its base adjacent the annulus, the opposite edges 9 of the shank tapering toward each other outwardly.

At their outer ends, the teeth are shaped to provide a pair of peripherally extending prongs or claws 10 projecting from opposite sides of the shanks 8, and in opposite directions. A head, generally T-shaped in contour, is thus formed at the tip or free end of each tooth. Spaces 11 are left between adjacent teeth approximately equal in size and shape to an inverted tooth.

It will be observed that inasmuch as the claws 10 are adjacent the top of the teeth they are spaced radially outward from the annulus and thus greater leverage is obtained than if the claws were adjacent the annulus. The contour of the claws is such that they are formed with a sharp edge or point 12 adapted to cut into the adjacent metal of a nut. As shown in the exemplary form the claws have outer edges 13 substantially parallel to the tapered edges 9 of the shank portion of the tooth, and inner edges 14 approximately at right angles thereto. The claws are arranged in staggered fashion, i. e., one claw of each tooth being bent upwardly and the other downwardly as shown in Fig. 6 to present the claw points 12 to both the nut and work.

A lock washer, in order to be effective, should be constructed so that its gripping portions do not flatten against the nut when clamped tightly but continue to bite into the nut so as to prevent loosening thereof. It is therefore desirable that the prongs forming the claws be bent rather sharply to provide sharp points or edges adapted to cut into the adjacent metal, and also that the prongs while sufficiently resilient to permit tightening of a nut, be at the same time substantially stiff and claw-like to cause the points to dig into the nut if the nut tends to loosen.

Figure 5:
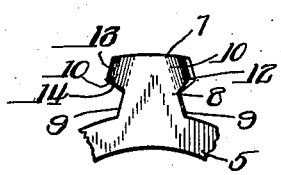
Fig. 5 is an enlarged fragmental view illustrating a tooth as embodied in the form of the invention shown in Fig. 2.
Figure 6:
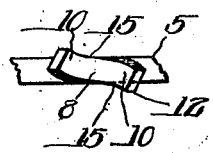
Fig. 6 is an end view of the tooth shown in Fig. 5.

As shown most clearly in Figs. 5 and 6 the shank portions of the teeth are twisted slightly from the plane of the washer, as, for example, about 10 degrees, so as to provide a slightly resilient support for the claws and thereby permit a nut to be tightened thereagainst. To stiffen the claw portions of the teeth and insure that the claws dig into the nut rather than seat and flatten under the clamping action, the claws 10 are not bent angularly with respect to the shank but are curved or rolled outwardly from the edges 9 of the shank 8 as at 15 (Fig. 6) to the points 12 of the claws. Therefore, if a nut is clamped tightly against the washer, the shank 8 may seat and flatten against the nut but the claws, instead of flattening as a unit, in effect unroll, thereby shortening and stiffening the effective tip portions of the claws as the nut clamps them more tightly, and causes them to dig into the nut. Then if the nut tends to loosen, the claws tend to cut deeper into the nut and effectively prevent such movement.

Figure 2:
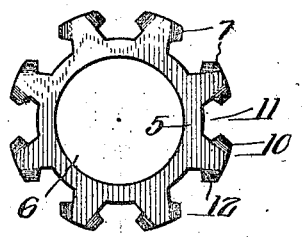
Fig. 2 is a face view of one form of the invention.
Figure 4:
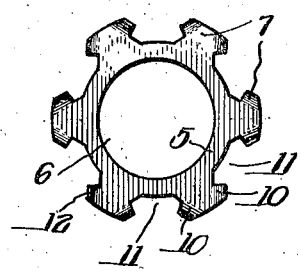
Fig. 4 is a face view of a six toothed washer as generally used with a ½" bolt.

A washer for a ½" bolt is preferably provided with six teeth as shown in Fig. 4, larger washers being provided with a greater number of teeth, as, for example, the one shown in Fig. 2.

Figure 3:
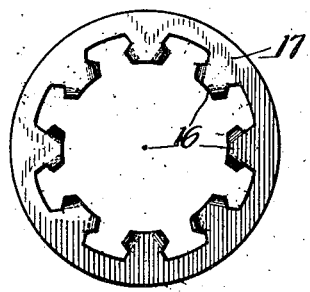
Fig. 3 is a face view of another form of the invention.

In the form illustrated in Fig. 3, the teeth 16 are of a construction similar to those in the other figures except that they extend internally of the annulus 17, this form being better adapted for some applications. It will be apparent upon reference to Figs. 2 and 3, that with the teeth shaped as illustrated, a washer similar to the one shown in Fig. 2 may be made from the internal punching of the one shown in Fig. 3.

From the foregoing it will be apparent that I have provided a lock washer of a highly efficient character. Such a washer is readily adapted to be manufactured at a low cost not alone because the teeth, being spaced peripherally, permit the punching of complementary washers such as shown in Figs. 2 and 3 with the corresponding economy in material, but also because the open slot construction leaving the spaces 11 between the teeth permits of low cost dies. With the gripping claws disposed outwardly from the annulus as shown in Fig. 2 a greater leverage is obtained than when placed adjacent the annulus. By spacing the points of the claws radially from the tips of the teeth they are certain of engaging the nut.

By twisting the shank slightly a resilient support is provided for the claws, and by widening the teeth at the top thereof it is possible to bend outwardly the claws thus formed. The curved claws, though they permit the nut to be tightened, resist complete seating against the nut and dig into the adjacent face thereof so that if the nut tends to loosen it is held not merely by a frictional contact but by the actual entering of the points of the claws into the nut. Upon loosening of the nut these claws would therefore tend to cut deeper into the nut.

I claim as my invention:

1. A lock washer comprising, in combination, an annulus having a bolt receiving aperture and a plurality of circumferentially spaced radially extending teeth formed integrally therewith, said teeth having shank portions twisted slightly from the plane of the washer and short sharp claws extending peripherally from the sides of said shank portions in a curve tangent thereto.

2. A lock washer comprising, in combination, an annulus and a plurality of circumferentially spaced radially extending teeth, said teeth having twisted shank portions and short stiff claws curved outwardly from the plane thereof adjacent the top of the teeth.

3. A lock washer comprising, in combination, an annulus and a plurality of circumferentially spaced teeth having tapered shank portions widest at their roots and claws spaced radially from said annulus and extending peripherally from the opposite ends of each of the shank portions, said claws being tapered to form sharp tips curved relative to the ends of the shank portions of the teeth.

4. A lock washer comprising an annulus having a plurality of circumferentially spaced radially extending teeth, said teeth having twisted shank portions and short stiff claws bent outwardly from the plane thereof adjacent the top of the teeth.

5. A lock washer formed from a flat piece of spring steel to provide an annulus having a plurality of circumferentially spaced teeth each comprising a tapering shank portion widest at its root and projecting radially from one peripheral edge of the annulus and a relatively wider tip portion, the opposite ends of the tip portion being bent in opposite directions from the plane of the annulus and each tapered to a sharp point spaced radially from the end of the tooth, said bent points thereby forming sharp stiff claws adapted to dig into the opposed surfaces of the parts to be locked together.

In testimony whereof, I have hereunto affixed my signature.

CARL O. SWENSON.